United States Patent
Katsuya

(10) Patent No.: US 12,463,467 B2
(45) Date of Patent: Nov. 4, 2025

(54) CONTACTLESS ELECTRIC POWER TRANSMISSION SYSTEM THAT CORRECTS A REQUEST FREQUENCY OF ELECTRIC POWER TRANSMISSION

(71) Applicant: HONDA MOTOR CO., LTD., Tokyo (JP)

(72) Inventor: Jin Katsuya, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 14 days.

(21) Appl. No.: 18/583,909

(22) Filed: Feb. 22, 2024

(65) Prior Publication Data

US 2024/0322600 A1 Sep. 26, 2024

(30) Foreign Application Priority Data

Mar. 20, 2023 (JP) .................. 2023-044194

(51) Int. Cl.
*H02J 50/12* (2016.01)
*H02J 7/00* (2006.01)
(Continued)

(52) U.S. Cl.
CPC ........ *H02J 50/12* (2016.02); *H02J 7/007194* (2020.01); *H02J 50/05* (2016.02); *H02J 50/80* (2016.02); *H02J 2310/48* (2020.01)

(58) Field of Classification Search
None
See application file for complete search history.

(56) References Cited

U.S. PATENT DOCUMENTS

| 2010/0320843 A1* | 12/2010 | Kitamura | ............... H01F 27/34 307/104 |
| 2011/0199046 A1* | 8/2011 | Tsai | ....................... H02J 50/20 320/108 |

(Continued)

FOREIGN PATENT DOCUMENTS

| JP | 2017-118690 | 6/2017 |
| JP | 2023-015843 | 2/2023 |

(Continued)

OTHER PUBLICATIONS

Japanese Office Action for Japanese Patent Application No. 2023-044194 mailed Oct. 1, 2024.

*Primary Examiner* — Adi Amrany
(74) *Attorney, Agent, or Firm* — Amin, Turocy & Watson, LLP

(57) ABSTRACT

A contactless electric power transmission system includes an electric power reception device and a control device. The electric power reception device receives AC electric power transmitted in a contactless manner from an electric power transmission device. The control device includes: a coil temperature detection portion that acquires temperatures of a secondary side coil, a magnetic member, and a secondary side capacitor of the electric power reception device; a magnetic member temperature detection portion; and a capacitor temperature detection portion. The control device includes a request frequency correction portion that corrects a request frequency of electric power transmission by the electric power transmission device based on the temperatures of the secondary side coil, the magnetic member, and the secondary side capacitor.

7 Claims, 6 Drawing Sheets

(51) Int. Cl.
 *H02J 50/05* (2016.01)
 *H02J 50/80* (2016.01)

(56) References Cited

U.S. PATENT DOCUMENTS

| | | | |
|---|---|---|---|
| 2015/0340881 A1* | 11/2015 | Nakano | H02J 7/007194 |
| | | | 307/104 |
| 2015/0372502 A1 | 12/2015 | Murayama | |
| 2017/0187243 A1 | 6/2017 | Sugiyama | |
| 2019/0341817 A1* | 11/2019 | Asai | H01F 38/14 |
| 2020/0091779 A1* | 3/2020 | Lee | H02J 50/10 |
| 2021/0023958 A1* | 1/2021 | Tombelli | B60L 53/305 |
| 2021/0300192 A1* | 9/2021 | Cho | B60L 53/12 |
| 2022/0130604 A1* | 4/2022 | You | H01F 27/025 |
| 2022/0239155 A1* | 7/2022 | Yang | H02J 50/80 |
| 2024/0308357 A1* | 9/2024 | Katsuya | B60L 53/126 |

FOREIGN PATENT DOCUMENTS

| | | |
|---|---|---|
| WO | 2014/196239 | 12/2014 |
| WO | 2016/157853 | 10/2016 |

\* cited by examiner

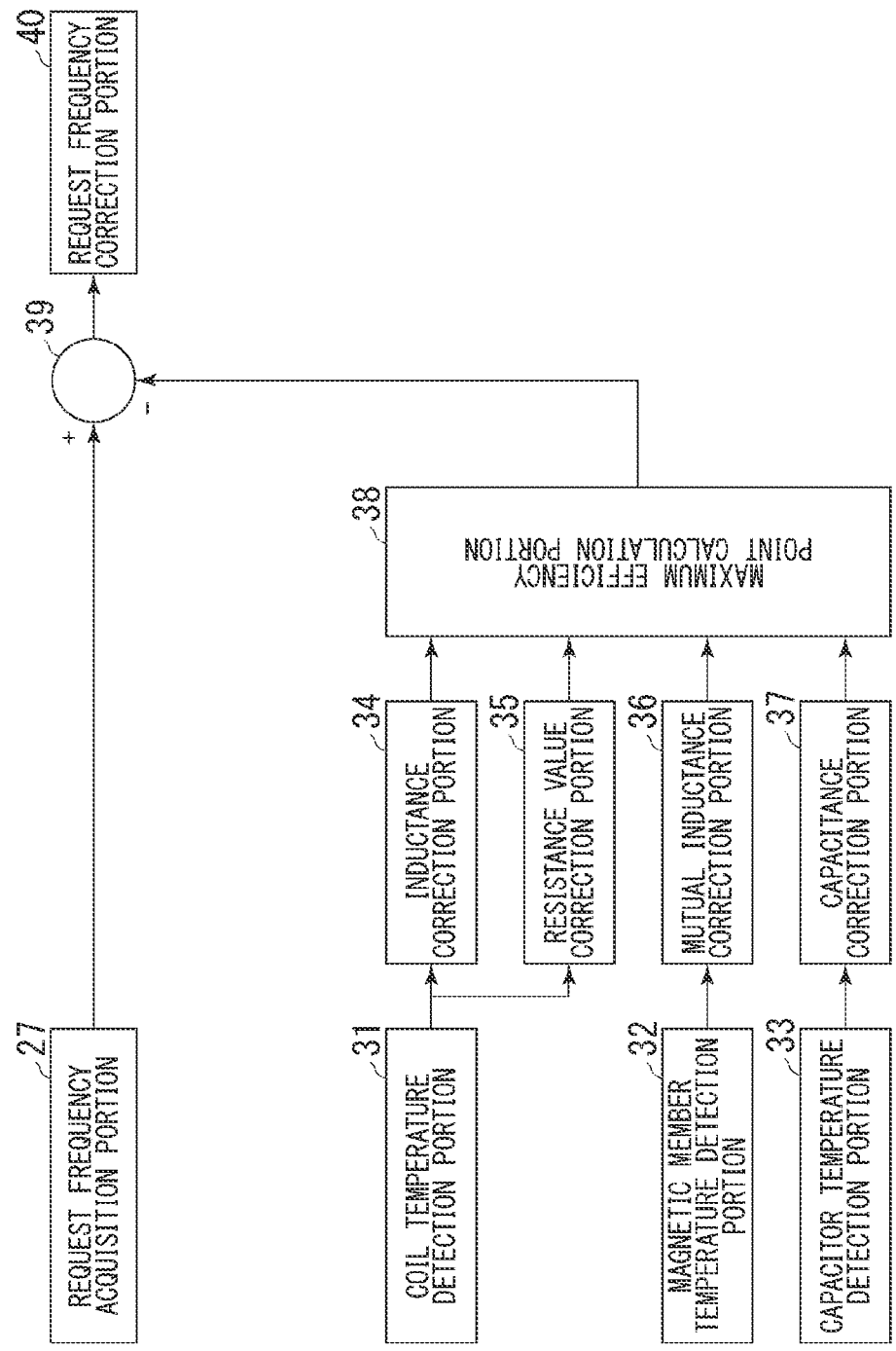

CONTACTLESS ELECTRIC POWER TRANSMISSION SYSTEM THAT CORRECTS A REQUEST FREQUENCY OF ELECTRIC POWER TRANSMISSION

CROSS-REFERENCE TO RELATED APPLICATION

Priority is claimed on Japanese Patent Application No. 2023-044194, filed on Mar. 20, 2023, the contents of which are incorporated herein by reference.

BACKGROUND

Field of the Invention

The present invention relates to a contactless electric power transmission system.

Background

In recent years, in order to ensure that more people have access to affordable, reliable, sustainable, and advanced energy, research and development relating to charging and electric power supply in a vehicle on which a secondary battery is mounted, which contributes to energy efficiency, has been conducted.

In the related art, in a contactless electric power transmission system that supplies electric power to a vehicle from the outside of the vehicle by contactless electric power transmission, a device is known which controls a switching frequency of an inverter circuit of an electric power transmission device such that an electric power supply efficiency to an electric power reception device is maximized in response to a temperature of an element such as a coil and a capacitor that constitute the electric power transmission device and the electric power reception device (for example, refer to PCT International Publication No. WO 2014/196239).

SUMMARY

In techniques relating to charging and electric power supply in a vehicle on which a secondary battery is mounted, it is desired to prevent an output decrease and a loss increase in accordance with variation of an eigenvalue (frequency) of a resonance circuit formed of a coil, a capacitor, and the like of an electric power reception side. For example, in the contactless electric power transmission system of the related art described above, in response to not only a decrease of an inductance associated with a temperature increase of the coil and a change of a capacitance associated with a temperature change of the capacitor but also temperature changes of other parts of the electric power reception device, the eigenvalue (frequency) of the resonance circuit may vary. For example, if the eigenvalue (frequency) of the resonance circuit varies in response to the temperature change or the like at a part cooled by a wind (travel wind or the like) received at the time a movable body moves, the output decrease and the loss increase may occur.

An aspect of the present invention aims to provide a contactless electric power transmission system capable of preventing an output decrease and a loss increase caused by variation of a temperature at an electric power reception side. Further, the aspect of the present invention contributes to energy efficiency.

A contactless electric power transmission system according to a first aspect of the present invention includes: an electric power reception portion having a coil that receives AC electric power transmitted in a contactless manner from an electric power transmission side coil of an electric power transmission device, a resonant capacitor connected in series to the coil, and a magnetic member provided for the coil; an electric power conversion portion that converts the AC electric power received by the electric power reception portion into DC electric power; and a control device that controls an operation of the electric power conversion portion, wherein the control device includes: a temperature acquisition portion that acquires temperatures of the coil, the capacitor, and the magnetic member; and a correction portion that corrects a request frequency of electric power transmission by the electric power transmission device based on the temperatures acquired by the temperature acquisition portion.

A second aspect is the contactless electric power transmission system according to the first aspect described above, wherein the correction portion may correct a self-inductance of the coil, a resistance value of the electric power reception portion, a capacitance of the capacitor, and a mutual inductance between the electric power transmission side coil and the coil based on the temperatures.

A third aspect is the contactless electric power transmission system according to the second aspect described above which may include: an electric power storage device connected to the electric power conversion portion, wherein the correction portion may correct the request frequency set based on a request electric power in accordance with a residual capacity of the electric power storage device.

According to the first aspect described above, by correcting the request frequency of electric power transmission by the electric power transmission device based on the temperatures of the coil, the capacitor, and the magnetic member of the electric power reception portion, the control device can prevent an output decrease and a loss increase of the electric power transmission caused by variation of the temperature at the electric power reception side.

In the case of the second aspect described above, by correcting the self-inductance of the coil of the electric power reception portion, the resistance value of the electric power reception portion, the capacitance of the capacitor of the electric power reception portion, and the mutual inductance, for example, even when an eigenvalue (frequency) of a resonance circuit varies in response to a temperature change or the like of the electric power reception portion, the control device can prevent an output decrease and a loss increase by the correction of the request frequency.

In the case of the third aspect described above, by correcting the request frequency set based on the request electric power in accordance with the residual capacity of the electric power storage device, the control device can prevent an output decrease and a loss increase of the electric power transmission while preventing the increase of charging and discharging of the electric power storage device associated with electric power transmission from the electric power transmission device and electric power consumption of a movable body.

BRIEF DESCRIPTION OF THE DRAWINGS

FIG. 6 is a block diagram showing a second functional configuration of the control device in the contactless electric power transmission system of the embodiment of the present invention.

DESCRIPTION OF EMBODIMENTS

Hereinafter, a contactless electric power transmission system according to an embodiment of the present invention will be described with reference to the drawings.

Figure 1:
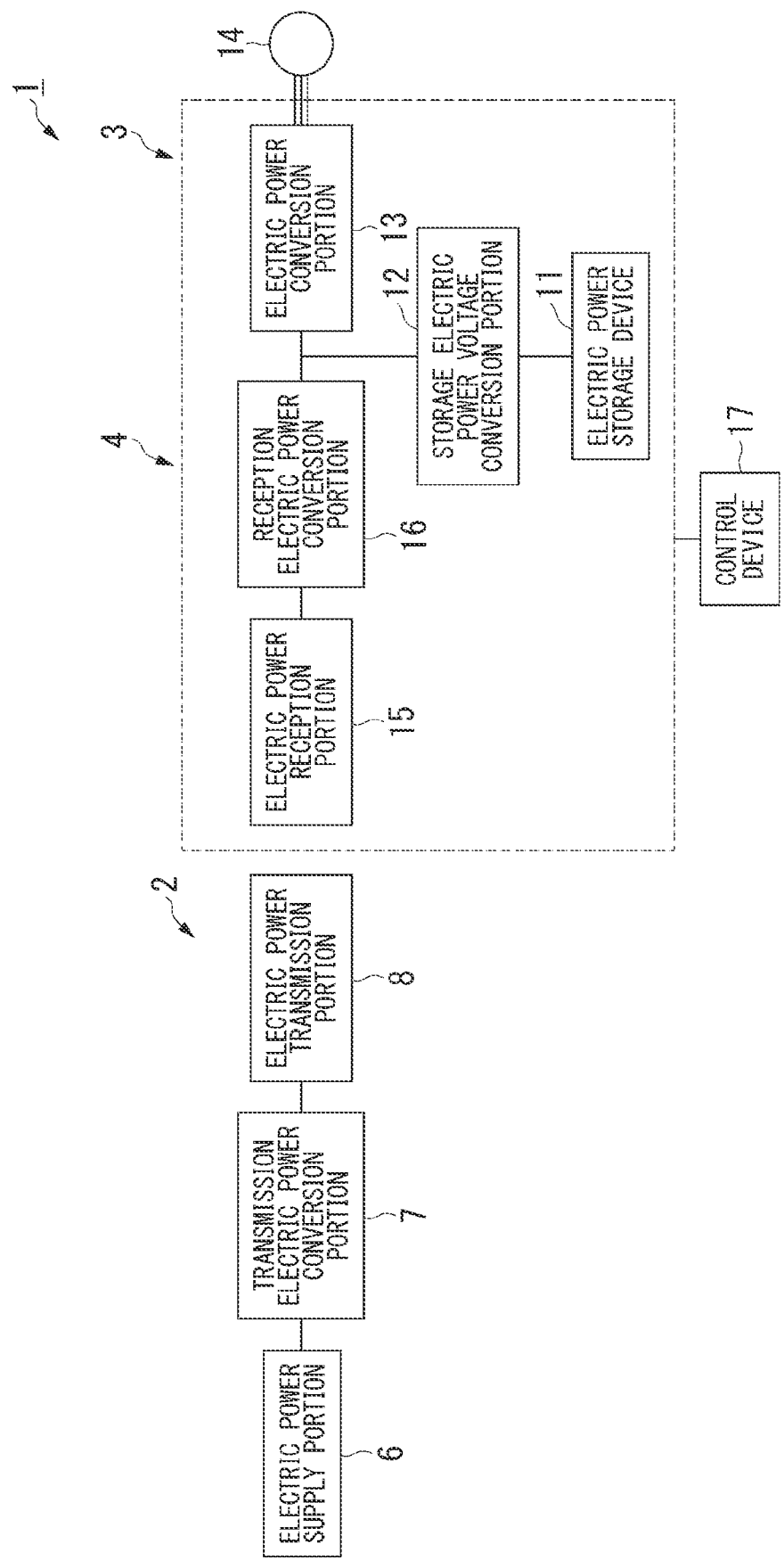
FIG. 1 is a view showing a configuration of a contactless electric power transmission system of an embodiment of the present invention.
Figure 2:
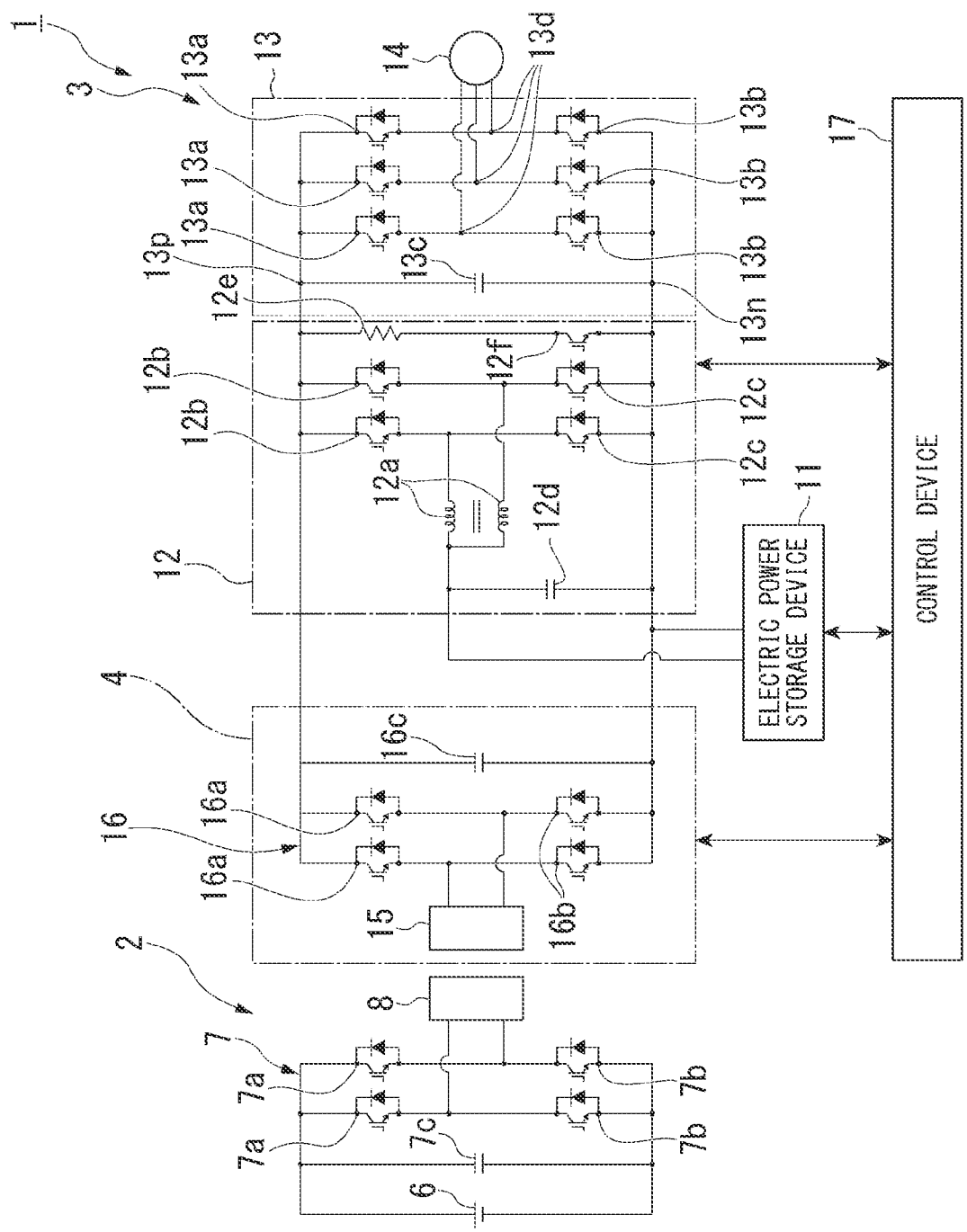
FIG. 2 is a view showing a detail of the configuration of the contactless electric power transmission system of the embodiment of the present invention.
Figure 3:
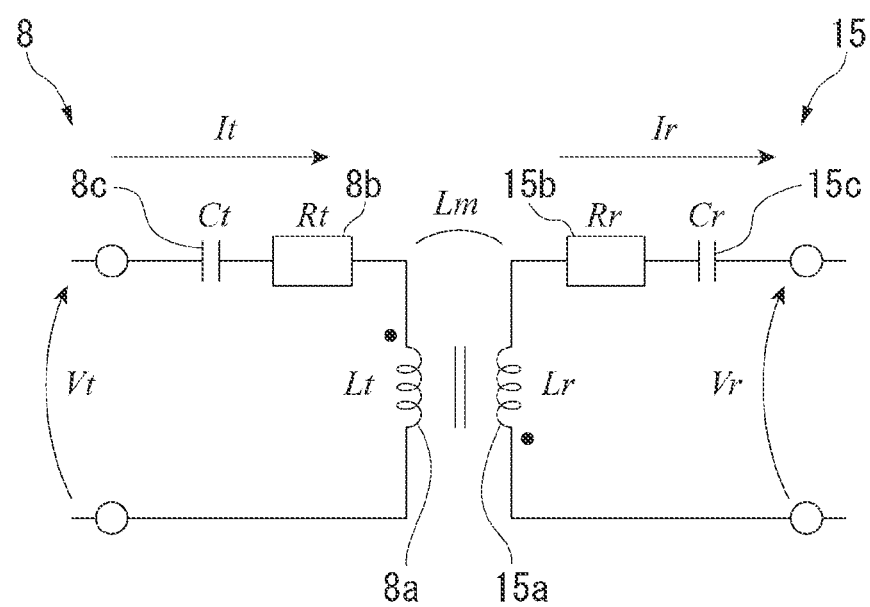
FIG. 3 is a view showing a configuration of an electric power transmission portion and an electric power reception portion in the contactless electric power transmission system of the embodiment of the present invention.
Figure 4:
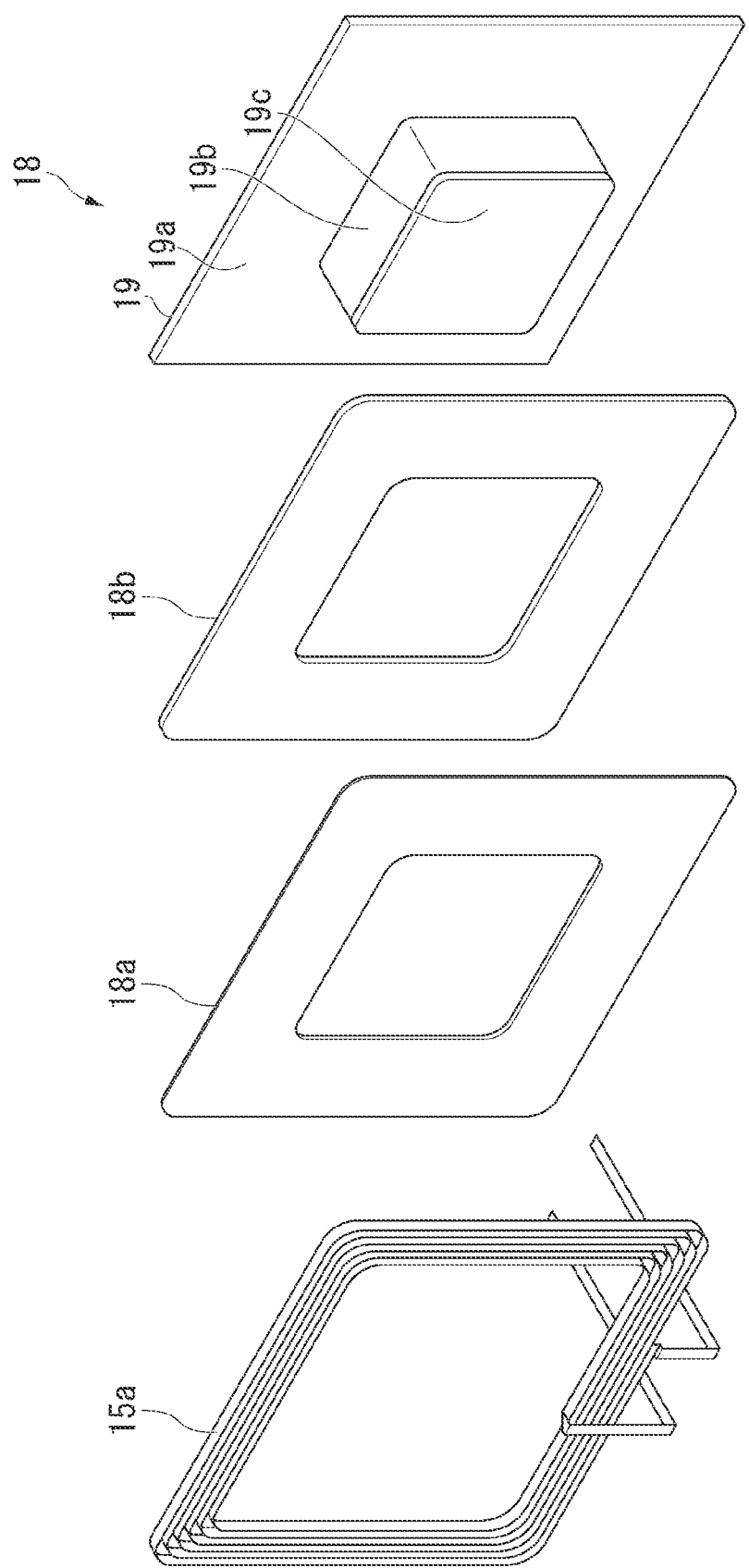
FIG. 4 is an exploded perspective view showing a configuration of a coil unit of the electric power reception portion in the contactless electric power transmission system of the embodiment of the present invention.

FIG. 1 and FIG. 2 are views showing a configuration of a contactless electric power transmission system 1 of an embodiment. FIG. 3 is a view showing a configuration of an electric power transmission portion 8 and an electric power reception portion 15 of the contactless electric power transmission system 1 in the embodiment. FIG. 4 is an exploded perspective view showing a configuration of a coil unit 18 of the electric power reception portion 15 in the contactless electric power transmission system 1 of the embodiment.

For example, the contactless electric power transmission system 1 of the embodiment supplies electric power from the outside of a movable body such as a vehicle to the movable body by contactless electric power transmission. Examples of the vehicle include electric vehicles such as electric automobiles, hybrid vehicles, and fuel cell vehicles.

(Contactless Electric Power Transmission System)

As shown in FIG. 1 and FIG. 2, the contactless electric power transmission system 1 of the embodiment includes: for example, an electric power transmission device 2 provided on a travel path or the like of a vehicle; and a drive control device 3 and an electric power reception device 4 that are mounted on a movable body such as a vehicle. The contactless electric power transmission system 1 of the embodiment may include at least configuration elements (for example, the drive control device 3 and the electric power reception device 4) mounted on the movable body, and the contactless electric power transmission may be performed by the combination of a configuration element (for example, the electric power transmission device 2) at the outside of the movable body and the contactless electric power transmission system 1 mounted on the movable body.

The electric power transmission device 2 includes, for example, an electric power supply portion 6, a transmission electric power conversion portion 7, and the electric power transmission portion 8. The electric power transmission device 2 may include, for example, at least a plurality of electric power transmission portions 8 in a predetermined electric power transmission zone on the travel path or the like of the vehicle.

The electric power supply portion 6 includes, for example, an AC electric power supply such as a commercial electric power supply, an AC-DC converter that converts AC electric power into DC electric power, and an electric power smoothing capacitor. The electric power supply portion 6 converts AC electric power supplied from the AC electric power supply into DC electric power by the AC-DC converter.

The transmission electric power conversion portion 7 includes, for example, an inverter that converts DC electric power into AC electric power. For example, the inverter of the transmission electric power conversion portion 7 includes: a bridge circuit formed of a plurality of switching elements connected in two phases by bridge connection and a rectifier element; and a voltage smoothing capacitor. Each switching element is, for example, a transistor such as a SiC (Silicon Carbide) MOSFET (Metal Oxide Semi-conductor Field Effect Transistor). The plurality of switching elements are high-side arm and low-side arm transistors 7a, 7b that form a pair in each phase. The rectifier element is, for example, a reflux diode connected in parallel to each transistor 7a, 7b. The voltage smoothing capacitor 7c is connected in parallel to the bridge circuit.

The electric power transmission portion 8 transmits electric power, for example, by a change of a high frequency magnetic field by magnetic field coupling such as magnetic field resonance or electromagnetic induction. As shown in FIG. 3, the electric power transmission portion 8 includes a resonance circuit formed of, for example, a primary side coil 8a (electric power transmission side coil), a primary side resistance 8b, and a primary side capacitor 8c that are connected in series. The electric power transmission portion 8 includes, for example, a sensor such as a current sensor that detects a current It flowing through the resonance circuit.

For example, the electric power transmission device 2 performs electric power transmission to the electric power reception device 4 of the vehicle by controlling the switching between ON (conduction) and OFF (cutoff) of each switching element of the transmission electric power conversion portion 7 in response to information of a drive frequency set in advance or a request frequency received from the electric power reception device 4.

As shown in FIG. 1 and FIG. 2, the drive control device 3 of the movable body such as a vehicle includes, for example, an electric power storage device 11, a storage electric power voltage conversion portion 12, an electric power conversion portion 13, and a rotary electric machine 14. The electric power reception device 4 of the movable body includes, for example, the electric power reception portion 15 and a reception electric power conversion portion 16. The drive control device 3 and the electric power reception device 4 include, for example, a common control device 17.

For example, in the case of an electric automobile or the like that is driven using the electric power storage device 11 as a power source, the drive control device 3 may not include the storage electric power voltage conversion portion 12. For example, in the case of a hybrid vehicle or the like that is driven using the electric power storage device 11 and an internal combustion engine as a power source, the drive control device 3 may include the storage electric power voltage conversion portion 12.

The electric power storage device 11 is connected to the storage electric power voltage conversion portion 12. The electric power storage device 11 is charged by electric power transmitted in a contactless manner from the electric power transmission device 2 at the outside of the vehicle. The electric power storage device 11 performs transmission and reception of electric power with the rotary electric machine 14 via the storage electric power voltage conversion portion 12 and the electric power conversion portion 13.

The electric power storage device 11 includes, for example, a battery such as a lithium-ion battery, a current sensor that detects a current of the battery, and a voltage sensor that detects a voltage of the battery.

For example, in an electric automobile or the like, when the storage electric power voltage conversion portion 12 is not provided, the electric power storage device 11 is connected to the electric power conversion portion 13 and the reception electric power conversion portion 16 described later.

The storage electric power voltage conversion portion 12 is connected to the electric power conversion portion 13 and the reception electric power conversion portion 16. The storage electric power voltage conversion portion 12 includes, for example, a voltage controller that performs a bi-directional voltage conversion of increasing the voltage and decreasing the voltage.

The voltage controller converts input electric power and output electric power at the time of charging and discharging of the electric power storage device 11 by the bi-directional voltage conversion. The voltage controller of the storage electric power voltage conversion portion 12 includes, for example, a pair of first reactors, a first element module, and a voltage smoothing capacitor.

The pair of first reactors 12a, 12a form a composite reactor by being magnetically coupled to each other at opposite polarity. The pair of first reactors 12a, 12a are connected to a connection point between a high side arm and a low side arm of each phase of the first element module.

The first element module includes a first bridge circuit formed of, for example, a plurality of switching elements connected in two phases by bridge connection and a rectifier element. Each switching element is, for example, a transistor such as a SiC MOSFET. The plurality of switching elements are high-side arm and low-side arm transistors 12b, 12c that form a pair in each phase. The rectifier element is, for example, a reflux diode connected in parallel to each transistor 12b, 12c. The voltage smoothing capacitor 12d is connected in parallel to the electric power storage device 11.

The storage electric power voltage conversion portion 12 includes a resistance 12e and a transistor 12f that are connected in series. The resistance 12e and the transistor 12f are connected in parallel to the first bridge circuit.

The pair of first reactors 12a, 12a and the first element module of the voltage controller perform voltage conversion by so-called two-phase interleaving. In the two-phase interleaving, one cycle of a switching control of a first-phase transistor 12b, 12c of two-phase transistors 12b, 12c connected to the pair of first reactors 12a, 12a and one cycle of a switching control of a second-phase transistor 12b, 12c are displaced from each other by half a cycle.

The electric power conversion portion 13 is connected to the rotary electric machine 14. The electric power conversion portion 13 includes, for example, an electric power converter that performs conversion between DC electric power and AC electric power. The electric power converter includes, for example, a second element module and a voltage smoothing capacitor.

The second element module includes a second bridge circuit formed of, for example, a plurality of switching elements connected in three phases by bridge connection and a rectifier element. Each switching element is, for example, a transistor such as a SiC MOSFET. The plurality of switching elements are high-side arm and low-side arm transistors 13a, 13b that form a pair in each phase.

The rectifier element is, for example, a reflux diode connected in parallel to each transistor 13a, 13b. The voltage smoothing capacitor 13c is connected in parallel to the second bridge circuit.

The second element module controls an operation of the rotary electric machine 14 by transmission and reception of electric power. For example, at the time of power running of the rotary electric machine 14, the second element module converts DC electric power input from DC terminals 13p, 13n of a positive electrode and a negative electrode into three-phase AC electric power and supplies the three-phase AC electric power from a three-phase AC terminal 13d to the rotary electric machine 14. The second element module generates a rotation drive force by sequentially commutating electric power supply to a three-phase stator winding of the rotary electric machine 14.

For example, at the time of regeneration of the rotary electric machine 14, the second element module converts the three-phase AC electric power input from the three-phase stator winding into DC electric power by the driving between ON (conduction) and OFF (cutoff) of the switching element of each phase synchronized with the rotation of the rotary electric machine 14. The second element module is capable of supplying the DC electric power converted from the three-phase AC electric power to the electric power storage device 11 via the storage electric power voltage conversion portion 12.

The rotary electric machine 14 is, for example, a three-phase AC brushless DC motor provided for traveling and driving of the vehicle. The rotary electric machine 14 includes a rotor having a field permanent magnet and a stator having a three-phase stator winding that generates a rotation magnetic field which rotates the rotor. The three-phase stator winding is connected to a three-phase AC terminal 13d of the electric power conversion portion 13.

The rotary electric machine 14 generates a rotation drive force by performing a power running operation using electric power supplied from the electric power conversion portion 13. For example, when the rotary electric machine 14 is connectable to a wheel of the vehicle, the rotary electric machine 14 generates a travel drive force by performing the power running operation using electric power supplied from the electric power conversion portion 13. The rotary electric machine 14 may generate electric power by performing a regeneration operation using a rotation power input from the wheel side of the vehicle. When the rotary electric machine 14 is connectable to the internal combustion engine of the vehicle, the rotary electric machine 14 may generate electric power using the power of the internal combustion engine.

The electric power reception portion 15 is connected to the reception electric power conversion portion 16. The electric power reception portion 15 receives electric power, for example, by a change of a high frequency magnetic field transmitted from the electric power transmission portion 8 by magnetic field coupling such as magnetic field resonance or electromagnetic induction. As shown in FIG. 3, the electric power reception portion 15 includes a resonance circuit formed of, for example, a secondary side coil 15a (coil), a secondary side resistance 15b, and a secondary side capacitor 15c (capacitor) that are connected in series. The electric power reception portion 15 includes, for example, a sensor such as a current sensor that detects a current Ir flowing through the resonance circuit.

As shown in FIG. 4, the coil unit 18 that constitutes part of the electric power reception portion 15 includes, for example, the secondary side coil 15a, an insulation member 18a, a ferrite core 18b, and a core member 19 (magnetic member).

An outer shape of the secondary side coil 15a is formed, for example, in a spiral form around a center axis line.

An outer shape of the insulation member 18a is formed, for example, in a rectangular sheet form in which a penetration hole is formed in a thickness direction. The insulation member 18a is formed of a material having an electrical insulation property.

An outer shape of the ferrite core 18b is formed, for example, in a rectangular plate form in which a penetration hole is formed in a thickness direction.

The core member 19 includes, for example, a plate shape portion 19a, a wall portion 19b, and a lid portion 19c. The core member 19 is formed of, for example, a magnetic material such as an electromagnetic steel plate such as a silicon steel plate.

An outer shape of the plate shape portion 19a is formed, for example, in a rectangular frame form in which a penetration hole that penetrates through a middle section in the thickness direction is formed.

An outer shape of the wall portion 19b is formed, for example, in a rectangular frame that protrudes in a direction along the center axis line from a circumferential edge section surrounding the penetration hole of the plate shape portion 19a. The wall portion 19b is arranged in an empty core region of the secondary side coil 15a and in the penetration holes of the insulation member 18a and the ferrite core 18b.

An outer shape of the lid portion 19c is formed, for example, in a rectangular plate form. The lid portion 19c closes an opening end of a front end section in the protrusion direction of the wall portion 19b.

The insulation member 18a, the ferrite core 18b, and the plate shape portion 19a of the core member 19 are arranged, for example, on a back side of the secondary side coil 15a when seen from the primary side coil 8a facing the secondary side coil 15a. The secondary side coil 15, the insulation member 18a, the ferrite core 18b, and the plate shape portion 19a are arranged to be sequentially laminated in the direction along the center axis line.

A capacitance of the secondary side capacitor 15c of the electric power reception portion 15 is set, for example, in accordance with a resonance point on a high frequency side of two resonance points in a frequency characteristic of an impedance of the resonance circuit of the electric power reception portion 15.

For example, a resonance point at which the impedance is locally minimized at a low-frequency side represents an in-phase resonance mode (low frequency mode), and a resonance point at which the impedance is locally minimized at a high-frequency side represents a reverse-phase resonance mode (high frequency mode). An anti-resonance point at which the impedance is locally maximized between the two resonance points represents a point of switching between the in-phase resonance mode and the reverse-phase resonance mode. For example, the capacitance of the secondary side capacitor 15c that is set at the time of manufacturing or the like is set in accordance with the frequency of the high frequency mode such that the resonance point is matched to the frequency of the high frequency mode in a predetermined normal temperature state.

The reception electric power conversion portion 16 shown in FIG. 1 and FIG. 2 is connected to the electric power conversion portion 13. The reception electric power conversion portion 16 includes a so-called full-bridgeless (or bridgeless and totem-pole) power factor correction (PFC) circuit that converts AC electric power into DC electric power. The so-called bridgeless PFC is a PFC that does not include a bridge rectifier using a plurality of diodes connected by bridge connection. The so-called totem-pole PFC is a PFC that includes a pair of switching elements having the same conductivity type connected (totem-pole connection) in series in the same direction.

The reception electric power conversion portion 16 includes: a third bridge circuit formed of, for example, a plurality of switching elements connected in two phases by bridge connection and a rectifier element; and a voltage smoothing capacitor. Each switching element is, for example, a transistor such as a SiC MOSFET. The plurality of switching elements are high-side arm and low-side arm transistors 16a, 16b that form a pair in each phase. The rectifier element is, for example, a reflux diode connected in parallel to each transistor 16a, 16b. The voltage smoothing capacitor 16c is connected in parallel to the third bridge circuit.

For example, the electric power reception device 4 that includes the electric power reception portion 15 and the reception electric power conversion portion 16 receives electric power transmitted from the electric power transmission device 2 by controlling the switching between ON (conduction) and OFF (cutoff) of each switching element of the reception electric power conversion portion 16 in response to information of a frequency of electric power transmission by the electric power transmission device 2.

The control device 17 integrally controls, for example, the drive control device 3 and the electric power reception device 4 of the movable body such as a vehicle. The control device 17 is, for example, a software function unit that functions by a predetermined program being executed by a processor such as a CPU (Central Processing Unit). The software function unit is an ECU that includes the processor such as a CPU, a ROM (Read Only Memory) that stores the program, a RAM (Random Access Memory) that temporarily stores data, and an electronic circuit such as a timer. At least part of the control device 17 may be an integrated circuit such as a LSI (Large Scale Integration).

For example, the control device 17 generates a control signal indicating a timing of driving each switching element to ON (conduction) and OFF (cutoff) and generates a gate signal for driving each switching element actually to ON and OFF on the basis of the control signal.

For example, by controlling the switching of each switching element of the electric power reception device 4, the control device 17 performs the power factor correction of the input voltage and the input current while rectifying AC electric power received from the electric power transmission device 2 to DC electric power.

For example, the control device 17 controls an output in accordance with a target output by a synchronous rectification operation that synchronously drives the plurality of switching elements of the electric power reception device 4 to ON and OFF and a short circuit operation that shorts the secondary side coil 15a.

For example, the control device 17 controls the synchronous rectification operation in accordance with the magnitude and the phase of a current generated in the electric power reception portion 15 by electric power transmitted from the electric power transmission device 2, that is, the current Ir flowing through the secondary side coil 15a. The control device 17 controls the plurality of switching elements of the reception electric power conversion portion 16 by soft switching of so-called zero voltage switching (ZVS).

In the zero voltage switching (ZVS), in each switching element, a voltage of both ends is set to zero by the discharge of an output capacitance (parasitic capacitance) in an OFF state in a dead time period of each phase, and then, turn-on (switching from an OFF state to an ON state) is performed.

For example, the control device 17 controls the short circuit operation by turning on only the low side arm of each phase while continuing the synchronous rectification operation of the zero voltage switching (ZVS) at the high side arm of each phase of the reception electric power conversion portion 16.

For example, the control device 17 sets a frequency (request frequency) required for electric power transmission by the electric power transmission device 2 in accordance with a residual capacity (SOC: State of Charge) of the electric power storage device 11.

Figure 5:
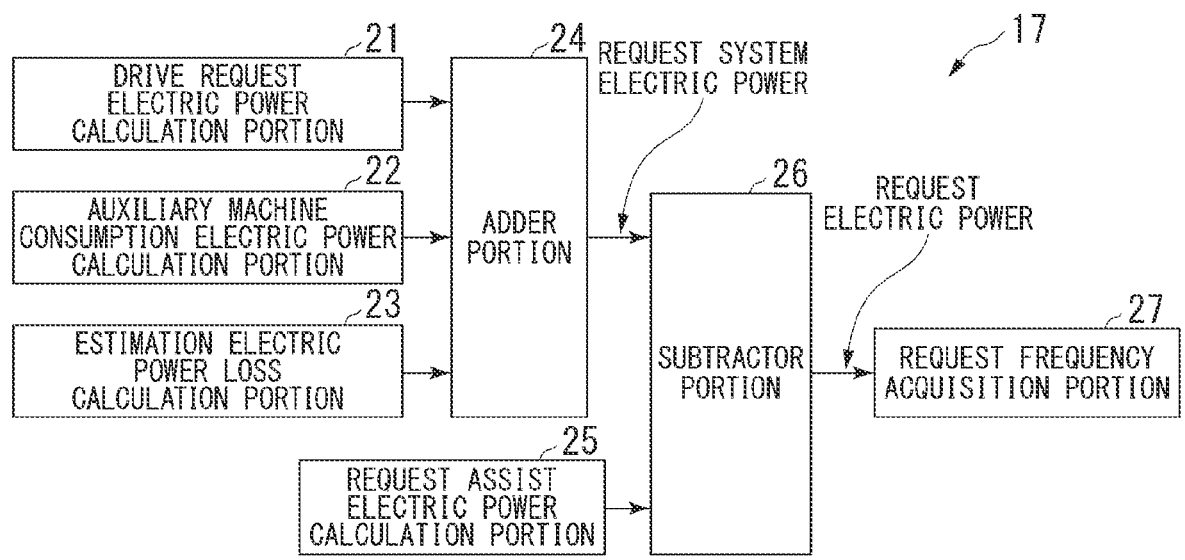
FIG. 5 is a block diagram showing a first functional configuration of a control device in the contactless electric power transmission system of the embodiment of the present invention.

FIG. 5 is a block diagram showing a first functional configuration of the control device 17 in the contactless electric power transmission system 1 of the embodiment.

As shown in FIG. 5, the control device 17 includes, for example, a drive request electric power calculation portion 21, an auxiliary machine consumption electric power calculation portion 22, an estimation electric power loss calculation portion 23, an adder portion 24, a request assist electric power calculation portion 25, a subtractor portion 26, and a request frequency acquisition portion 27.

The drive request electric power calculation portion 21 calculates, for example, electric power (drive request electric power) supplied to the rotary electric machine 14 from the electric power conversion portion 13 required in accordance with a target drive force of the rotary electric machine 14 or the movable body. The target drive force is calculated, for example, based on outputs of various sensors relating to the state of the rotary electric machine 14 or the travel state of the movable body. Examples of the various sensors include: a speed sensor that detects a speed of the vehicle; an accelerator position sensor that detects an accelerator operation amount; a current sensor, a voltage sensor, and a temperature sensor that detect the state of the rotary electric machine 14; and the like.

The auxiliary machine consumption electric power calculation portion 22 calculates consumption electric power (auxiliary machine consumption electric power) of various auxiliary machines connected to the electric power storage device 11, for example, on the basis of the outputs of the various sensors. Examples of the various sensors include a current sensor, a voltage sensor, a temperature sensor, and the like for detecting the state of the electric power storage device 11, consumption electric power of the various auxiliary machines, and the like. Examples of the various auxiliary machines include an electric power converter, an air conditioner, various pumps, and the like.

The estimation electric power loss calculation portion 23 calculates, for example, electric power losses estimated in the storage electric power voltage conversion portion 12 and the reception electric power conversion portion 16.

The adder portion 24 calculates electric power (request system electric power) required for the system by adding the drive request electric power input from the drive request electric power calculation portion 21, the auxiliary machine consumption electric power input from the auxiliary machine consumption electric power calculation portion 22, and the electric power loss input from the estimation electric power loss calculation portion 23.

The request assist electric power calculation portion 25 calculates electric power (request assist electric power) in accordance with a residual capacity (SOC: State of Charge) required based on, for example, ensuring of a desired output of the electric power storage device 11 or the like.

The subtractor portion 26 calculates the request electric power which is a target of electric power received from the electric power transmission device 2 by the electric power reception device 4 by subtracting the request assist electric power input from the request assist electric power calculation portion 25 from the request system electric power input from the adder portion 24.

The request frequency acquisition portion 27 calculates a frequency (request frequency) required for electric power transmission of the electric power transmission device 2 in response to the request electric power input from the subtractor portion 26.

The request frequency acquisition portion 27 acquires the request frequency corresponding to the request electric power, for example, on the basis of data of a correspondence relationship between the output and the frequency of electric power transmission indicating a different characteristic depending on the combination of a magnetic body, a coil, and the like in each of the electric power transmission portion 8 of the electric power transmission device 2 and the electric power reception portion 15 of the electric power reception device 4.

For example, the control device 17 corrects a request frequency on the basis of respective temperatures of elements constituting the electric power reception portion 15 and the magnetic member constituting the coil unit 18.

FIG. 6 is a block diagram showing a second functional configuration of the control device 17 in the contactless electric power transmission system 1 of the embodiment.

As shown in FIG. 6, the control device 17 includes, for example, a coil temperature detection portion 31 (temperature acquisition portion), a magnetic member temperature detection portion 32 (temperature acquisition portion), a capacitor temperature detection portion 33 (temperature acquisition portion), an inductance correction portion 34 (correction portion), a resistance value correction portion 35 (correction portion), a mutual inductance correction portion 36 (correction portion), a capacitance correction portion 37 (correction portion), a maximum efficiency point calculation portion 38 (correction portion), a difference calculation portion 39 (correction portion), and a request frequency correction portion 40 (correction portion).

The coil temperature detection portion 31 includes a temperature sensor that detects a temperature of the secondary side coil 15a and outputs a signal of a detection value of the temperature.

The magnetic member temperature detection portion 32 includes a temperature sensor that detects a temperature of a magnetic member such as, for example, the plate shape portion 19a of the core member 19 and outputs a signal of a detection value of the temperature.

The capacitor temperature detection portion 33 includes a temperature sensor that detects a temperature of the secondary side capacitor 15c and outputs a signal of a detection value of the temperature.

The inductance correction portion 34 corrects a self-inductance Lr of the secondary side coil 15a with reference to data for correction set in advance in accordance with the detection value of the temperature of the secondary side coil 15a output from the coil temperature detection portion 31.

The resistance value correction portion 35 corrects a resistance value Rr of the resonance circuit of the electric power reception portion 15 with reference to data for correction set in advance in accordance with the detection value of the temperature of the secondary side coil 15*a* output from the coil temperature detection portion 31.

The mutual inductance correction portion 36 corrects a mutual inductance Lm between the primary side coil 8*a* and the secondary side coil 15*a* with reference to data for correction set in advance in accordance with the detection value of the temperature of the magnetic member output from the magnetic member temperature detection portion 32.

The capacitance correction portion 37 corrects a capacitance Cr of the secondary side capacitor 15*c* with reference to data for correction set in advance in accordance with the detection value of the temperature of the secondary side capacitor 15*c* output from the capacitor temperature detection portion 33.

The maximum efficiency point calculation portion 38 calculates a frequency @ at a maximum efficiency point where an efficiency n of electric power transmission between the primary side coil 8*a* and the secondary coil 15*a* is maximized based on the self-inductance Lr, the resistance value Rr, the mutual inductance Lm, and the capacitance Cr corrected by the correction portions 34, 35, 36, and 37.

For example, as shown in Expression (1) described below, the efficiency n of the electric power transmission is described by the frequency @ of the electric power transmission, the mutual inductance Lm, a load resistance value (resistance value on a load side when seen from the electric power transmission portion 8 and the electric power reception portion 15) R, the resistance value Rr, the self-inductance Lr, the capacitance Cr, and a resistance value Rt of the resonance circuit of the electric power transmission portion 8.

[Expression 1]

$$\eta = \frac{(\omega Lm)^2 R}{\left\{(Rr+R)^2 + \left(\omega Lr - \frac{1}{\omega Cr}\right)^2\right\} Rt + (\omega Lm)^2 (Rr+R)} \quad (1)$$

The difference calculation portion 39 calculates a difference between the request frequency output from the request frequency acquisition portion 27 and the frequency @ at the maximum efficiency point output from the maximum efficiency point calculation portion 38.

The request frequency correction portion 40 corrects the request frequency in accordance with the difference of the frequency output from the difference calculation portion 39.

The control device 17 transmits, to the electric power transmission device 2, the calculated and corrected request frequency at each timing before the movable body arrives at each electric power transmission zone of the electric power transmission device 2, for example, by an appropriate communication between the electric power transmission device 2 and the movable body. The communication between the electric power transmission device 2 and the movable body is, for example, a communication by an inductor voltage between the coils 8*a*, 15*a* of the electric power transmission device 2 and the electric power reception device 4, a wireless communication by a communication device additionally provided on each of the electric power transmission device 2 and the movable body, or the like.

As described above, according to the contactless electric power transmission system 1 of the embodiment, by correcting the request frequency of electric power transmission by the electric power transmission device 2 based on the respective temperatures of the secondary side coil 15*a*, the core member 19, and the secondary side capacitor 15*c*, the control device 17 can prevent an output decrease and a loss increase of the electric power transmission caused by variation of the temperature at the electric power reception side.

By correcting the self-inductance Lr of the secondary side coil 15*a*, the resistance value Rr of the electric power reception portion 15, the capacitance Cr of the secondary side capacitor 15*c*, and the mutual inductance Lm, for example, even when an eigenvalue (frequency) of a resonance circuit varies in response to a temperature change or the like of the electric power reception portion 15, the control device 17 can prevent an output decrease and a loss increase by the correction of the request frequency.

By correcting the request frequency set based on the request electric power in accordance with the residual capacity (SOC) of the electric power storage device 11, the control device can prevent an output decrease and a loss increase of the electric power transmission while preventing the increase of charging and discharging of the electric power storage device 11 associated with electric power transmission from the electric power transmission device 2 and electric power consumption of the movable body.

MODIFICATION EXAMPLE

Hereinafter, a modification example of the embodiment is described. The same portions as those of the embodiment described above are denoted by the same reference numerals, and descriptions thereof are omitted or simplified.

The above embodiment is described using an example in which the control device 17 includes the temperature detection portions 31, 32, 33; however, the embodiment is not limited thereto. For example, the control device 17 may calculate the temperature of each part by a process of temperature estimation based on a thermal resistance at each part of the electric power reception portion 15, an ambient temperature of the electric power reception portion, the cooling by a wind (travel wind or the like) received at the time of moving of the movable body, and the like in place of the temperature detection portions 31, 32, 33.

The above embodiment is described using an example in which the contactless electric power transmission system 1 includes the storage electric power voltage conversion portion 12 that converts an input-output electric power of the electric power storage device 11; however, the embodiment is not limited thereto. The storage electric power voltage conversion portion 12 may be omitted.

For example, in the case of a hybrid vehicle or the like that is driven using the electric power storage device 11 and an internal combustion engine as a power source, the drive control device 3 may include the storage electric power voltage conversion portion 12, and in the case of an electric automobile or the like that is driven using the electric power storage device 11 as a power source, the drive control device 3 may not include the storage electric power voltage conversion portion 12.

These embodiments of the present invention have been presented as examples and are not intended to limit the scope of the invention. These embodiments can be implemented in a variety of other modes, and various omissions, substitutions, and modifications can be made without departing from the scope of the invention. These embodiments and modifications thereof are included in the scope and gist of the invention and are also included in the scope of the invention described in the appended claims and equivalent thereof.

What is claimed is:

1. A contactless electric power transmission system, comprising:
an electric power reception portion having
a coil that receives AC electric power transmitted in a contactless manner from an electric power transmission side coil of an electric power transmission device,
a resonant capacitor connected in series to the coil, and
a magnetic member provided for the coil;
an electric power conversion portion that converts the AC electric power received by the electric power reception portion into DC electric power; and
a control device that controls an operation of the electric power conversion portion,
wherein the control device comprises:
a first temperature acquisition portion that acquires a temperature of the coil;
a second temperature acquisition portion that acquires a temperature of the capacitor;
a third temperature acquisition portion that acquires a temperature of the magnetic member; and
a correction portion that corrects a request frequency of electric power transmission by the electric power transmission device based on the temperatures acquired by the first temperature acquisition portion, the second temperature acquisition portion, and the third temperature acquisition portion,
wherein the correction portion corrects at least one of a self-inductance of the coil, a resistance value of the electric power reception portion, a capacitance of the capacitor, and a mutual inductance between the electric power transmission side coil and the coil based on the temperatures.

2. The contactless electric power transmission system according to claim 1,
wherein the correction portion corrects the self-inductance of the coil, the resistance value of the electric power reception portion, the capacitance of the capacitor, and the mutual inductance between the electric power transmission side coil and the coil based on the temperatures.

3. The contactless electric power transmission system according to claim 2, comprising:
an electric power storage device connected to the electric power conversion portion,
wherein the correction portion corrects the request frequency set based on a request electric power in accordance with a residual capacity of the electric power storage device.

4. The contactless electric power transmission system according to claim 1,
wherein the magnetic member is a core member.

5. The contactless electric power transmission system according to claim 4,
wherein the core member comprises: a plate shape portion having a penetration hole that penetrates in a thickness direction; a wall portion that protrudes in a direction along a center axis line from a circumferential edge section surrounding the penetration hole; and a lid portion that closes an opening end of a front end section in a protrusion direction of the wall portion, and
the wall portion is arranged in an empty core region of the coil.

6. The contactless electric power transmission system according to claim 5,
wherein the third temperature acquisition portion detects a temperature of the plate shape portion.

7. The contactless electric power transmission system according to claim 5,
wherein the plate shape portion is arranged on a back side of the coil when seen from the electric power transmission side coil facing the coil.

* * * * *